(No Model.)
T. FURLONG.
PNEUMATIC TIRE.
No. 582,194. Patented May 11, 1897.
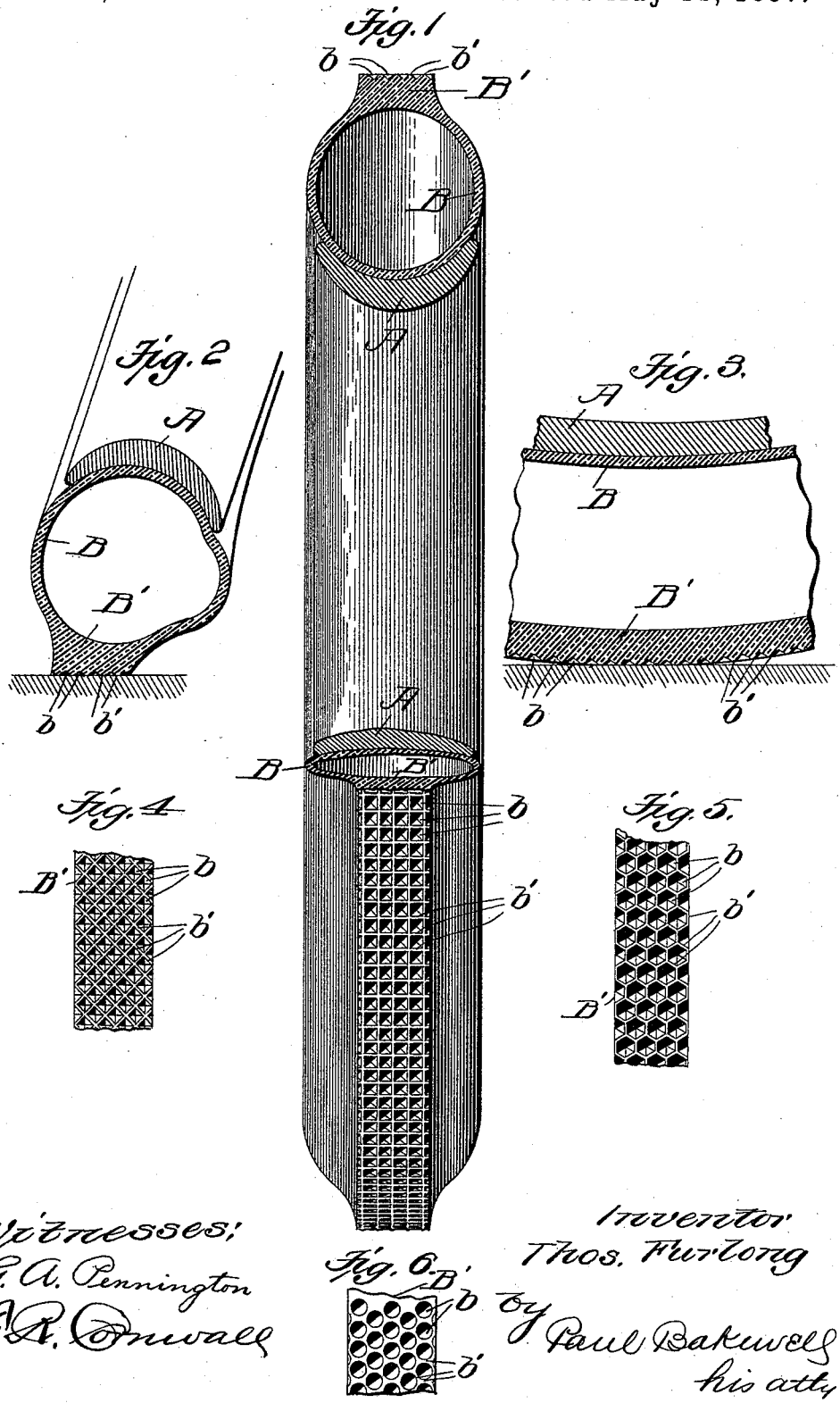
Witnesses:
G. A. Pennington
F. R. Cornwall
Inventor
Thos. Furlong
by Paul Bakewell
his atty
THE NORRIS PETERS CO., PHOTO-LITHO., WASHINGTON, D. C.

UNITED STATES PATENT OFFICE.

THOMAS FURLONG, OF ST. LOUIS, MISSOURI.

PNEUMATIC TIRE.

SPECIFICATION forming part of Letters Patent No. 582,194, dated May 11, 1897.

Application filed October 2, 1896. Serial No. 607,705. (No model.)

*To all whom it may concern:*

Be it known that I, THOMAS FURLONG, a citizen of the United States, residing at the city of St. Louis, State of Missouri, have invented certain new and useful Improvements in Pneumatic Tires, of which the following is a full, clear, and exact description, reference being had to the accompanying drawings, forming a part of this specification, wherein—

Figure 1 is an elevational view of a pneumatic tire embodying my invention, part of the same being broken away to show the tire in cross-section. Fig. 2 is a cross-sectional view showing the position of the tire on the wheel when the wheel is tilted. Fig. 3 is a longitudinal sectional view through a portion of the tire. Figs. 4, 5, and 6 are modified forms of the tire-tread.

Heretofore, so far as I am aware, pneumatic tires have generally been formed with a smooth tread. Some tires have a flat periphery or tread, others are round, while others still are corrugated or fluted, the corrugations extending entirely around the tire. I am also aware that fabric has been used as an outer covering for tires, which offers a rough surface known as the "pebble-tread." In no tire has there appeared a honeycombed or cellular tread, nor am I aware that a tire has been produced which utilizes these cells on the tread, not only to an advantage so far as a frictional or biting surface is concerned, but also to take advantage of the grip resulting from the rarefied air in the cells due to the compression of the walls of the cells, which causes a partial vacuum to be produced, so that the suction resulting therefrom will establish a firm hold of the tire on the ground, floor, street, or other place where it rests, preventing lateral slipping as well as slipping in the direction of travel.

My invention therefore consists in a pneumatic tire the tread of which is honeycombed or cellular, whereby the tire may take a firm hold on the ground, due to the biting edges on the tread, as well as the suction created.

Another feature of my invention resides in making the crown portion thicker than the sides of the tire and in forming a flat tread on said thickened crown, whereby the tire is resilient principally at its sides, and when the wheel encircled by the tire occupies an angular position, as shown in Fig. 2, the tread will still have a full bearing.

Other features of the invention reside in the construction, arrangement, and combination of the several parts, all as will hereinafter be described and afterward pointed out in the claim.

In the drawings, A indicates the wooden rim of a bicycle-wheel, shown here for convenience, it forming no part of my invention.

B indicates the tire, which is preferably composed of pure rubber, strengthened by fabric or other material, as is well understood. This tire is adapted to fit in the concavity of the wheel-rim.

The outer periphery or crown portion of the tire is thickened by forming compound curves, as shown at the top, Fig. 1, which terminate at the edge of a flat tread B'. By so increasing the thickness of the tire at the tread it will be seen that this portion of the tire has little or no resiliency, the side walls of the tire being depended upon for this, with the result that when the wheel assumes an angle, as shown in Fig. 2, the tread will still remain flat on the ground, affording as firm a bearing as when in a vertical position. The shape in cross-section which the tire assumes under these conditions—that is, the inner or lower side wall bulging out distinctly beyond the rim—tends to resist rotary motion of the tire in its rim. Therefore the central or true position of the tread is not liable to be displaced under such circumstances. In this connection I will say that I also prefer to cement the tire to the rim to further resist rotary motion of the tire on its rim, should it have such a tendency.

The tread of the tire, as before stated, is honeycombed, or cellular preferably, as shown in Figs. 1, 2, and 3; but there are other forms of cells which accomplish the same purpose, as shown in Figs. 4, 5, and 6. In all these forms $b$ indicates cells, depressions, or pockets of such size, shape, and depth as may be preferred. I have shown them as of inverted pyramidal form, except in Fig. 6, where they are shown circular. Each cell, except those at the edges of the tread, is surrounded by walls $b'$, whose faces are on the same plane, so that as they strike the ground all the cells in transverse rows whose walls are in contact with the ground will be closed. It is of course understood that as the tire travels over the ground any point on its tread comes in contact with the ground before the greatest pressure or weight is placed upon that point, and that after the weight or pressure passes that point said point will still remain on the ground for some little time. It is on account of this varying pressure that I am enabled to produce a partial vacuum in the cells after the walls of said cells are relieved of their greatest pressure—that is, when the walls of any particular cell or transverse row of cells are under their greatest pressure the air in the cells will be forced out by reason of the gradual approach to said great pressure, and as the cell or cells under consideration pass beyond said pressure the elasticity of the walls asserts itself to the extent of its strength, with the result that the air is rarefied or a partial vacuum produced whose suction or hold is determined by the joint between the walls of the cell and the ground, the rarefication of the air, and the elasticity of the rubber.

From the above it will be understood that in sandy ground, where the air can penetrate into the cells through the sand, the cells will be of little advantage, except as to the extent of the biting edges presented by the walls, while on asphaltum, granite block, and other smooth pavements beneficial results will flow from their presence, especially in preventing lateral slipping. Wet pavement and rails can also be ridden over in safety, the water appearing to act as a seal for the cell-walls. Practical usage has demonstrated the fact that a tire provided with a cellular tread, as shown in the drawings, will not slip on wet asphaltum or wet street-car tracks, even when the rails are approached at an acute angle.

The edges of the tread are preferably serrated, which results from forming said edges to the outside of the outer circumferentially-disposed walls. The object of this is to have biting-points at the edge of the tread to grip rails and to assist in climbing out of ruts, as is well understood.

Having thus described my invention, what I claim, and desire to secure by Letters Patent of the United States, is—

An inflatable tire formed with a reinforced or thickened outer portion, the outer face or tread of which is flat and formed throughout with a closely-associated series of indentations or pockets, substantially as described.

In testimony whereof I hereunto affix my signature, in presence of two witnesses, this 26th day of September, 1896.

THOMAS FURLONG.

Witnesses:
F. R. CORNWALL,
HUGH K. WAGNER.